April 2, 1940.　　　　　C. A. KENT　　　　　2,195,701

SOUND FILM SYSTEM

Filed Aug. 18, 1937　　　3 Sheets-Sheet 1

INVENTOR
CHARLES A. KENT

April 2, 1940.                    C. A. KENT                    2,195,701
                              SOUND FILM SYSTEM
                     Filed Aug. 18, 1937         3 Sheets-Sheet 2
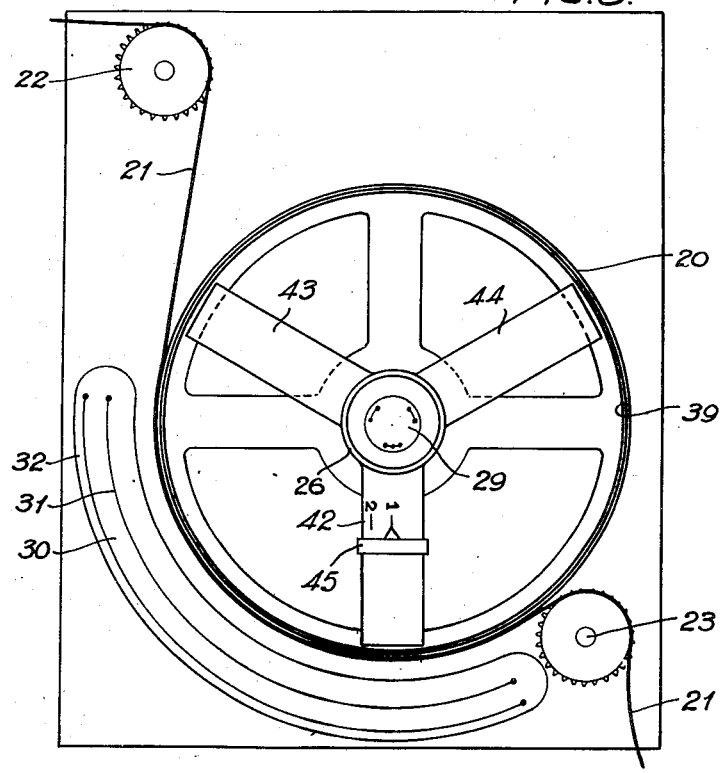
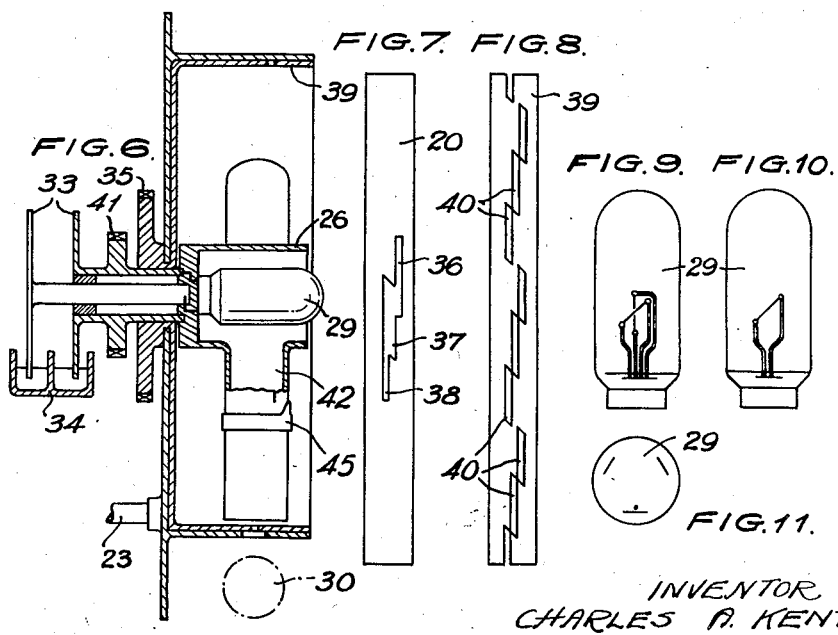
INVENTOR
CHARLES A. KENT

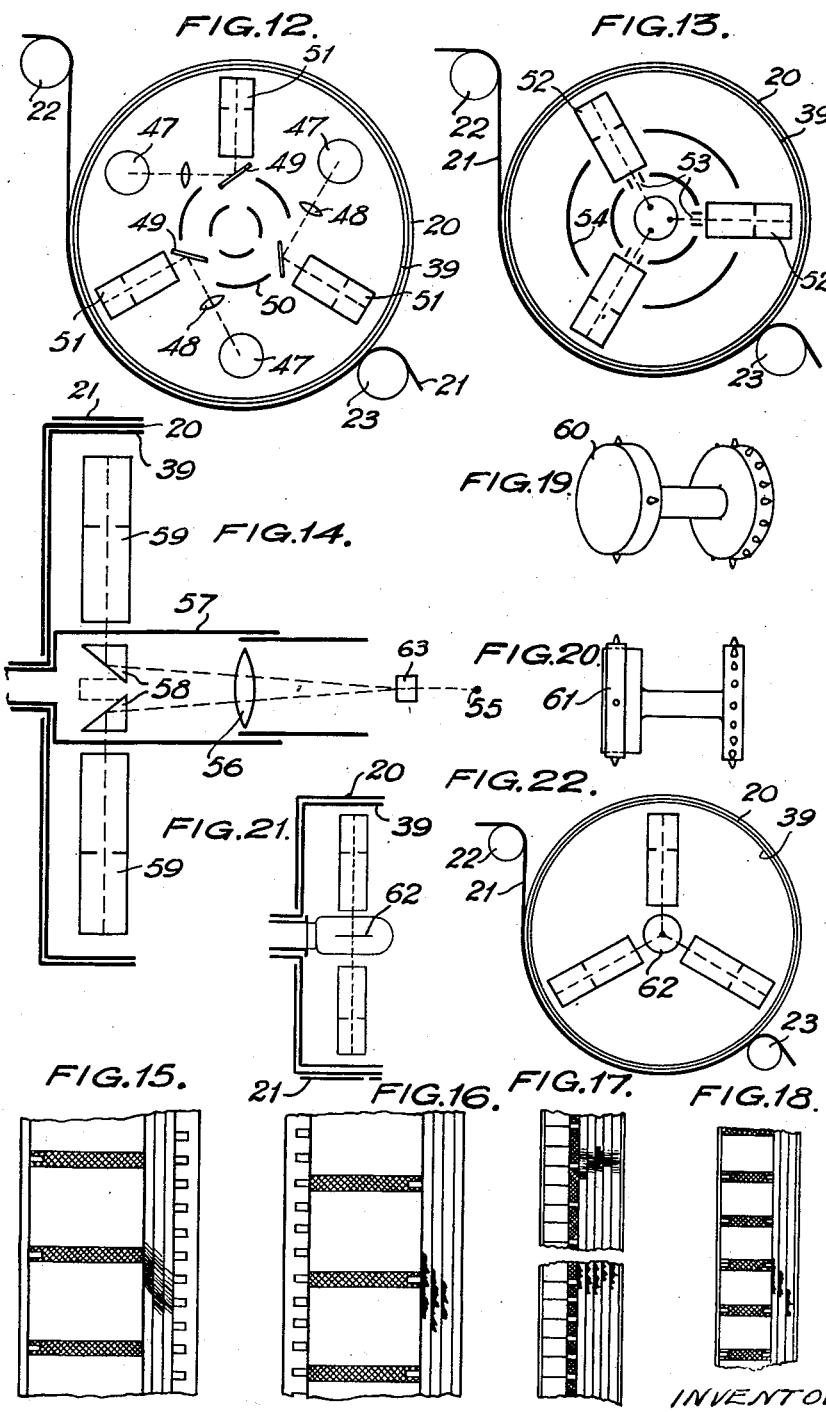

Patented Apr. 2, 1940

2,195,701

UNITED STATES PATENT OFFICE 2,195,701

SOUND FILM SYSTEM

Charles Alfred Kent, Aldershot, England

Application August 18, 1937, Serial No. 159,791
In Great Britain July 24, 1936

4 Claims. (Cl. 179—100.3)

This invention relates to a new or improved sound film system, and has for its main object to render better sound reproduction than is obtainable with present systems particularly in regard to the higher end of the audio-frequency band, so as to overcome loss and attenuation of those frequencies which are experienced with systems at present in use. These defects and the general inefficiency of the sound reproduction in films as now made are due to the fact that for reasons of economy and mechanical limitations it is only possible to pass them through the recorder and reproducer at a speed (e. g., 18 inches per second) which is insufficient to provide the length of sound track necessary for the true recording of the higher audio frequencies and their retention on the film after allowing for processing losses that inevitably occur. An object of the invention is to achieve the more faithful reproduction without having to increase the speed of the film, and in fact in a manner which enables the present film speed to be reduced to the original speed that applied to silent films.

A still further object of the invention is to provide for increasing the speed of scanning the sound track in relation to the actual film speed, in order to secure the better reproduction. Further, the invention aims at providing an apparatus of simple and foolproof construction for achieving the above objects, and one which is capable of reproducing existing films as well as films which are especially made for use with it as hereinafter set forth.

Figure 2:
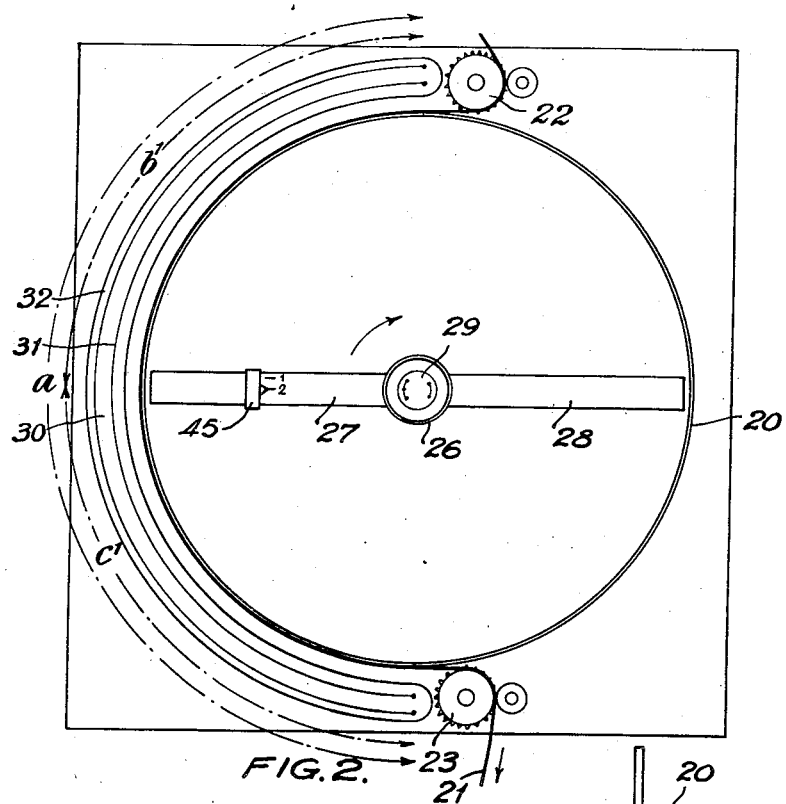
Figure 1:
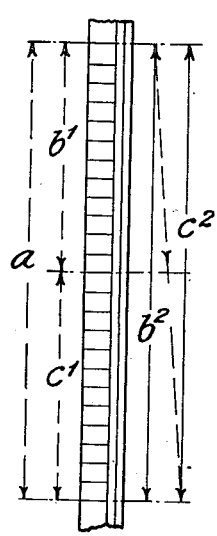
Figure 3:
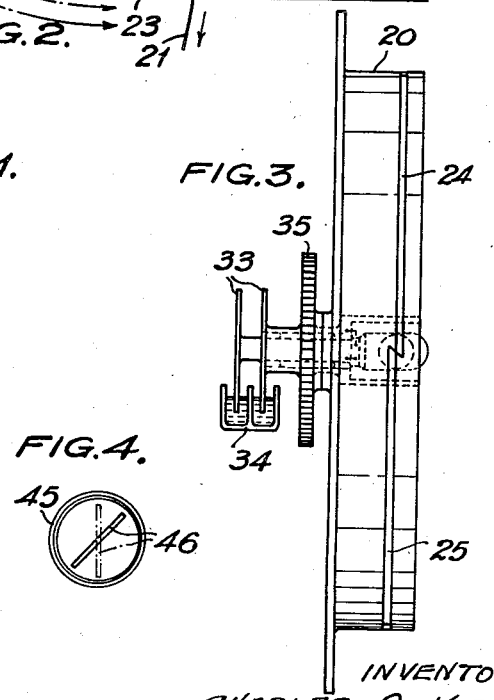
Figure 4:

The invention will be readily understood by reference to the accompanying drawings wherein:

Figure 1 is an explanatory diagram of a film having double sound tracks. Figure 2 is a face view of a reproducer designed to reproduce from such double sound-track film. Figure 3 is a side view of Figure 2 showing the photo-electric cell removed. Figure 4 is an end view of one of the scanning limbs provided on the scanning unit. Figure 5 is a face view of a reproducer adapted to reproduce from film having three sound tracks. Figure 6 is a side view of the apparatus shown in Figure 5. Figure 7 is a development plan of slot formations in a drum provided in the apparatus shown in Figure 5. Figure 8 is a development plan of slot formations in a beam-splitter provided in the apparatus shown in Figure 5. Figures 9, 10 and 11 are elevations and a plan of an exciter lamp provided for the apparatus according to Figures 2 and 5. Figures 12, 13 and 14 are diagrams of sound recording apparatus that can be used in the making of the film. Figures 15, 16, 17 and 18 are diagrams of different film constructions that can be used in carrying out the invention, and Figures 19 and 20 are views of film sprockets for use with the invention and Figures 21 and 22 are sectional and face views of a reproducer that can be provided in a particular case as hereinafter described.

In order to convey a clear understanding of the invention, particularly in regard to the method of recording, the sound tracks and scanning them in reproduction, reference is first directed to Figure 1 of the drawings which shows a strip of film.

The recording and reproducing apparatus hereinafter described is designed to deal with a suitable predetermined length or section of film in each complete cycle of operation and in Figure 1 the length of the section is indicated by reference $a$. During the passage through the sound-head of that portion of the film indicated by reference $b^1$, that is to say one-half of the length of section $a$, a sound track represented by reference $b^2$ having a length equal to the full length of section $a$ is explored by the recorder or reproducer as the case may be. During the passage of the remaining half of section $a$, that is to say the portion $c^1$, a second sound track represented by reference $c^2$ and lying side-by-side with the first track, is explored throughout its full length, said track $c^2$ also being equal in length to the section $a$. Thus the tracks $b^2$ and $c^2$ jointly form the sound accompaniment for a film section having a length equal to that of one of them and are explored in sequence, each containing one-half of the sound accompaniment. The tracks are explored in upward direction assuming the film is travelling downwards, but alternatively they can be read in the same direction as the film movement.

It will be understood therefore that each sound track must be explored at a speed which is double the film speed, and it is this increased speed of exploration that achieves the improved reproduction.

As stated the above method of exploration results in double-speed recording and scanning of the sound accompaniment but the invention also provides for exploring the sound accompaniment at three, four, five, six or more times the speed of the film, by likewise multiplying the number of sound tracks and arranging them in side-by-side relation and providing means whereby they are read in sequence to form the complete accompaniment, and all in the time that it takes for the film to move through the section $a$.

For ease of understanding the reproduction apparatus will be described first, and this will be followed by a description of suitable recording apparatus. For the same reason the reproducing mechanism to be used with a film having only two sound tracks forming half-portions of a complete accompaniment of a specified film-section, will be described to begin with.

The apparatus for this purpose is shown in

Figures 2 and 3 and comprises a stationary drum 20 around which passes the film 21 guided by the projector sprocket 22 and continuous sprocket 23. Through the drum are formed two slots 24, 25 arranged in staggered relation, each extending through 90 degrees and arranged so that the slot 25 commences where the slot 24 terminates. Thus the two slots together extend through 180 degrees, and the peripheral length of the drum portion contained in that angle represents the section of the film that is to be dealt with in one complete cycle of the apparatus, that is to say the secion $a$ shown in Figure 1, and again indicated by $a$ in Figure 2.

Within the drum is housed a rotary scanning unit comprising a hub 26 from which radiate a pair of tubular limbs 27, 28 which are diametrically opposite one another, said limbs being fitted with suitable lenses for the control of light rays propagated by an exciter lamp 29 housed within the hub 26. The limbs 27, 28 are provided internally with discs having scanning slits adapted to traverse the drum slots 24, 25 as the scanning unit rotates.

Outside the drum there is mounted an arcuate photo-electric cell 30 extending through the combined lengths of the slots 24, 25 and having an anode 31 and cathode coating 32, each of which extend through the full length of the tube and in register with the two slots. Thus when the scanning unit rotates, the scanning slits of the limbs 27, 28 will modulate the cell 30 throughout their traverse of the slots 24, 25.

In the example shown the exciter lamp 29 rotates with the scanning unit and is electrically fed through the medium of metallic discs 33 insulated from one another, said discs being partially immersed in mercury cups 34 of a trough member made of insulating material, the leads of the external circuit being led to the mercury therein.

At the back of the drum the scanning unit is fitted with a fixed pinion 35 by which it is suitably driven from the continuous sprocket drive.

Dealing now with the working of the device shown in Figures 2 and 3 and referring also to Figure 1, during the movement of the film through the first half of section $a$ from the starting position shown in Figure 2, that is to say through the distance $b^1$ (Figures 1 and 2) the limb 27 of the scanning unit also sweeps through the distance $b^1$, the angular speed of travel of the film around the drum being equal to the angular speed of the scanning unit, but the latter moving in opposite direction to that of the film. Thus the speed at which the scanning unit explores the film is twice the speed of the film around the drum. This means that the entire length of one sound track having a length equal to that of section $a$ (i. e., $b^2$ Figure 1) is explored during the film travel equal to one half of distance $a$. The limbs 27, 28 now have vertical dispositions, and the limb 28 is ready to explore the second sound track by way of the slot 25. During the movement of the film through the remaining half of distance $a$, that is to say through the distance $c^1$ (Figures 1 and 2) the limb 28 will sweep through the distance $c^1$ and explore the full length of the second sound track ($c^2$, Figure 1). Thus during the movement of the film through distance $a$, the sound tracks have been explored in sequence at double speed.

Referring now to Figures 5 and 6 illustrating a reproducer for scanning three sound tracks in sequence, and all within the time taken for the film to move through the one section, there is now provided a fixed drum 20 having formed therein three slots 36, 37, 38 (or their equivalent in one stepped slot, see development plan, Figure 7) said slots being arranged in stepped relation to register with the respective sound tracks arranged side-by-side on the film, and to come into operation progressively at the required moments. There is now provided within the drum a masking ring 39 which is freely rotatable with respect to the drum and which is hereinafter referred to as a beam-splitter. The object of this beam-splitter is to confine the exciter beam to the particular sound track being dealt with, and for this purpose it has formed through it a series of slots 40 arranged in staggered progression as shown in the development plan thereof (Figure 8). The rotary scanning device in this case comprises a hub 26 from which radiate three tubular scanning limbs 42, 43, 44, set 120 degrees apart. Each limb has a scanning slit and an exciter lamp 29 is housed within the hub 26 as before. This lamp is arranged to turn with the scanning unit and is fed through the medium of mercury cups 34 and contact immersion discs 33 as before. The continuous sprocket drive 23 (Figures 5 and 6) is geared by suitable gearing (not shown on the drawings, since ratios depend upon film sizes) to pinion 41, of the rotary scanning unit, which in turn is geared to and drives pinion 35 of the beam-splitter at a different speed. The relative speeds of the different parts in this case are such that the angular speed of the scanning unit is double the angular speed of the film around the drum with the result that the scanning unit explores a distance equal to two thirds of a film section whilst the film moves through one third of the section making in the aggregate (since the scanning unit moves in reverse direction to the film) a traverse equal to the full length of the section, the beam-splitter meanwhile turning through such a distance (in the same direction as the scanning unit) that the appropriate one of the slots 40 has completed its movement past the limb 42, 43 or 44 which is then operative so as to confine the exciting beam to the required sound track. The next succeeding scanning limb now comes into operation and the beam-splitter is correctly positioned in relation thereto to confine the beam to the second sound track. The same applies with the scanning limb which next approaches and on the completion of the operation thereof the cycle is complete. The following table gives the preferred relative rotational speeds of the parts and speed of the film for films of different sizes, but this may be varied as desired:

| Continuously moving film sprocket (number of picture frames pulled through) | Scanning unit geared to continuous sprocket drive in ratio | Beam splitter drive geared to drive of scanning unit in ratio | Time period (seconds) | | Footage (approx.) and sectional scan length of sound track ins. |
|---|---|---|---|---|---|
| | | | 16 frames per sec. | 24 frames per sec. | |
| 35 mm. 8 | 1 revolution. | ⅓rd revolution. | ½ | ⅓rd | 6 |
| 16 mm. 8 | 1 revolution. | ⅓rd revolution. | ½ | ⅓rd | 2¾ |
| 8 mm. 16 | 1⅔rd revolution. | 1 revolution. | 1 | | 2⅜ |
| 8 mm. 24 | 1⅔rd revolution. | 1 revolution. | | 1 | 3½ |

Although in Figures 2 and 5 the electrical connections to the lamp are showing as passing through from the same side as the gearing; i. e., from the back it is to be understood that as an alternative they may be arranged at the front.

It will be understood that the reproducer made as above described for use with a film having three sound tracks is made appreciably smaller (e. g., in regard to drum diameter) than one for use with a film having only two sound tracks. The reason is that the film moves a correspondingly shorter distance during the exploration of a single track.

In order that a film of standard size may contain the additional number of sound tracks, the invention further contemplates a modification in the manner of recording and reproduction such as to permit narrower sound tracks to be used without decreasing the normal volume range. This is achieved by recording in such a manner that the frequency impressions lie obliquely across the film. It is necessary therefor, that the scanning slits also have the same oblique setting and consequently the scanning limbs 28 (Figure 2) and 43, 44 (Figure 5) have their slits thus disposed. The limb 27 (Figure 2) and 42 (Figure 5) however are fitted internally each with a partially rotatable disc having the scanning slit and having an external operating collar 45 and this disc in one position has the slit 46, Figure 4, obliquely disposed whilst in the other position it is horizontally disposed (at right angles to direction of film travel). In the latter position the apparatus is able to reproduce from existing sound film, the drive to the scanning unit being then disconnected and the limb 27 or 42 as the case may be, being then set to be operative, in stationary position.

The exciter lamp 29, if provided with separate filaments for the individual scanning limbs will have said filaments angularly set to correspond with the oblique setting of the scanning slits as shown in Figure 10. The filament forcing the limb 27 or 42 as the case may be, is also provided with a horizontal filament (Figure 9) for illuminating the scanning slit when the disc 45 is set for use with conventional sound film. The lamp shown (see plan view Figure 11) is designed for use with the scanner unit having three limbs as above described. Should the photoelectric cell give an uneven response it may be corrected by means of a photographic density filter electrically produced.

Recording apparatus for the recording of the film may take one of the forms shown in Figures 12, 13 and 14, that shown in Figure 12 being intended for the variable area type of recording whilst the forms shown in Figures 13 and 14 are for variable density recording. In each form the recording apparatus is identical with the reproduction apparatus above set forth except for the omission of the photo-electric cell and the substitution of suitable means for imparting modulated recorder light to a negative film instead of scanning a positive film. In Figure 12 the rotary recorder assembly (corresponding to the rotary scanning unit of the reproducer) embodies recorder lamps 47, condenser lenses 48, magnetic field 50, oscillograph mirrors 49, all of which will be actuated simultaneously in known manner through impulses conveyed through suitable connections (such as the mercury cups and contact discs) and suitable apertured lens fitted tubes 51 corresponding to the scanning limbs in the reproducer. In the density recording apparatus shown in Figure 13 there is provided a central recorder lamp having separate filaments for apertured lens-fitted tubes 52, and rotating with the assembly, the latter embodying magnetic field 54, and moving light gates 53. Another form of recording apparatus may have a modulated glow-lamp situated in the hub of the rotary unit.

In the apparatus shown in Figure 14 there is provided a stationary light source 55, a stationary light cell 63 for modulating the beam, a stationary lens 56 and a rotary unit including a light-conducting tube 57 and prisms or mirrors 58 for deflecting the beam along the lens-fitted tubes 59. If so desired in any of these examples of recording apparatus, the entire light-modulating unit may be placed within the hub of the rotary unit, the drum being made larger in diameter to allow of this and the rotary unit being provided with four lens tubes.

Figure 15 shows a method of modifying a conventional film so as to enable the pictorial matter to be displaced to one side to give additional room for the extra sound tracks, and yet at the same time allow the film to be passed through an ordinary projector suitably adapted. This is achieved by placing the perforations of one row in the usual blank spaces between the picture frames. This simply necessitates the use of a modified standard conventional sprocket having intermediate teeth removed on one wheel 60 (Figure 19). Conventional film can be passed by this sprocket when required since the width between the wheels is the normal spacing. If the modified film (Figure 16) is used, a sprocket having an adjustable toothed ring 61 (Fig. 20) can be employed, said ring 61 being slid inwards for using such film and being moved outwards for use with conventional film. Suitable means will be provided for maintaining said adjustable ring in such position. Figure 17 shows one mode of forming 8 mm. film with perforations either in register with each picture frame or alternatively in register with alternative frames, the film shown having five sound tracks. Ordinary silent 8 mm. film can be passed through a projector designed to use this film. A suitable method of forming the perforations in 16 mm. film is shown in Figure 18, the film shown having three sound tracks.

To permit the use of a stationary exciter lamp in the case of sub-standard films it is preferred to record the sound so that the frequencies are recorded at right angles to the line of travel of the film, the above described apparatus being suitably modified, but the sloped recording may be employed if desired. In a reproducer which is simply intended for use with film having the frequencies recorded transversely of the track (i. e., at right angles to the film travel) the exciter lamp may be stationary and have a single vertical filament 62 as shown in Figures 21 and 22.

It will be understood that the film may be cut and joined at any sectional continuance line of the sound track without upsetting the synchronism of sound to picture.

Various modifications may be made without departing from the scope of the invention. For instance the sound tracks may be scanned in any pre-arranged sequence other than in consecutive order. A modified scanning device that could be employed is one having a series of lenses reciprocating, i. e., moving up and down a vertical sound gate and the same can apply backwards and forwards across a horizontal sound gate and sound tracks. Also the apparatus could be modified to traverse the sound tracks in the same direction as the film movement but at greater speed.

To avoid friction between the film and stationary drum in the recording and reproducing apparatus hereinbefore described, the drum may be fitted with an outer ring rotating around it and on which the film lies. This outer ring, if furnished with teeth and, if suitably driven, may serve the purpose of the ordinary continuous sprocket.

A modification that can be made in regard to the reproducing apparatus shown, is the substitution for the arcuate photo-electric cell of a mirror arranged to reflect the light modulations throughout the explorations of the sound tracks, on to a conventional type of photo-electric cell.

A further modification that may be made in regard to those forms of recording and reproducing apparatus embodying a beam-splitter, is the substitution for the rotary beam-splitter described, of a beam-splitter which has no rotary movement but which simply moves in oscillating fashion laterally across the drum in order to limit the beam to one sound track at a time, suitable means which is provided for effecting this movement being actuated by the drive of the sound unit.

I claim:

1. The method of recording and reproducing sound films which consists in exploring different sound tracks in immediate succession by one and the same exploring element of a rotary unit while the film is moving through a distance occupied by several picture frames and then causing another exploring element of said unit to likewise explore the same tracks in succession and to commence its operation at a point coinciding transversely of the film with a point where the preceding exploring element changed over from one track to another during the course of its operation.

2. An apparatus for use in the recording or reproduction of sound films comprising a stationary drum around which the film is adapted to pass, said drum having peripheral, circumferentially extending slots disposed in staggered relation circumferentially of the drum and in side-by-side planes to accord with the planes of side-by-side sound tracks on the film, and a rotary scanning unit for scanning the sound tracks through the drum slots, said rotary unit having scanning limbs each constructed to be operative with all of the relatively staggered slots of the drum so as to operate with said slots in sequence in a single exploration, thereby to give a continuous reproduction, means for driving said unit so that its speed relative to the film exceeds the actual film speed, and an arcuate photo-electric cell externally of said drum subtending the drum slots.

3. An apparatus according to claim 2 wherein the rotary recording or scanning unit houses in its hub a stationary modulated lamp and wherein the branches of said unit consist of tubes having lenses therein and internal scanning slits.

4. An apparatus for the reproduction of sound films according to claim 2, having a toothed outer ring rotating around the drum and upon which the film lies, and by which it is engaged.

CHARLES ALFRED KENT.